K. VON KANDO.
CATENARY SUSPENSION SYSTEM FOR THE TROLLEY WIRES OF ELECTRIC RAILWAYS.
APPLICATION FILED OCT. 2, 1908.

942,143.

Patented Dec. 7, 1909.

WITNESSES

INVENTOR
KALMAN VON KANDO
By Clifford Bull
HIS ATTORNEYS

UNITED STATES PATENT OFFICE.

KALMAN VON KANDO, OF VADO LIGURE, ITALY, ASSIGNOR TO GEORGE WESTINGHOUSE, OF PITTSBURG, PENNSYLVANIA.

CATENARY SUSPENSION SYSTEM FOR THE TROLLEY-WIRES OF ELECTRIC RAILWAYS.

942,143. Specification of Letters Patent. Patented Dec. 7, 1909.

Application filed October 2, 1908. Serial No. 455,933.

*To all whom it may concern:*

Be it known that I, KALMAN VON KANDO, a subject of the Emperor of Austria-Hungary, and a resident of Vado Ligure, Italy, have invented a new and useful Improvement in Catenary Suspension Systems for the Trolley-Wires of Electric Railways, of which the following is a specification.

In suspension systems for the trolley wires of electric railways it is a matter of importance to be able to regulate exactly the relative position of the trolley wires and the track. When several trolley wires are employed the problem increases in importance, because in this case it is also necessary to adjust the position of the trolley wires with reference to one another.

In the catenary method of suspension the adjustment of the trolley wires in the lateral direction is usually effected by displacing the insulators which carry the suspension cable or wire and the regulation in the vertical direction is obtained by varying the lengths of the connecting pieces between the suspension cable or wire and the trolley wires. This alteration in the length of the connecting pieces is a difficult and troublesome operation to carry out in the short period of time allotted for repair in cases of breakdown. According to the present invention an intermediate member is carried on the insulator and the suspension cable or wire is clamped to said intermediate member by means which can be adjusted so as to vary the height of the suspension cable as desired.

Figure 1:
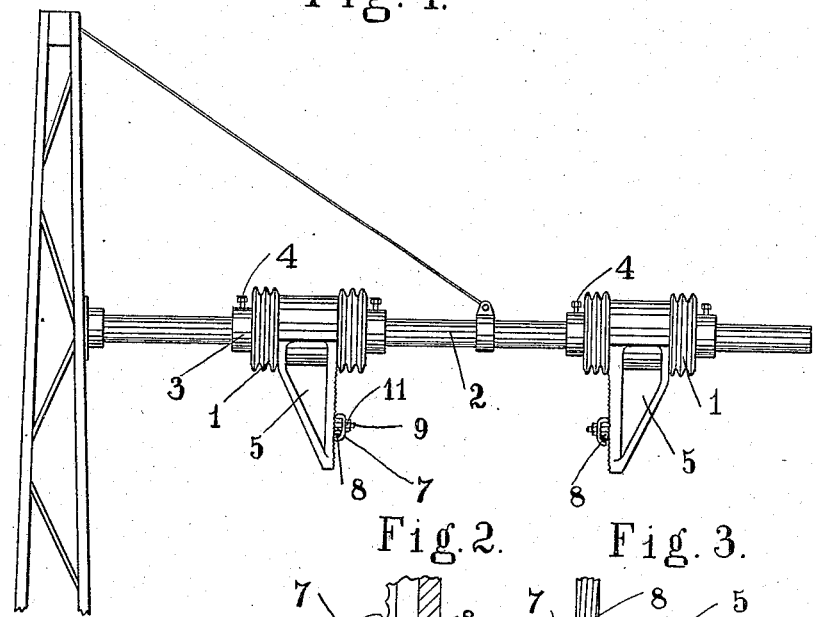
Figures 2, 3:
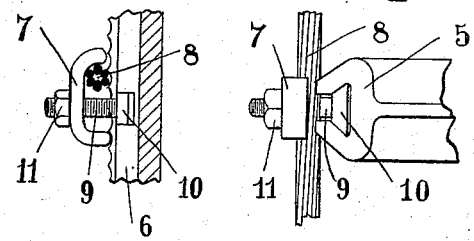
Figure 4:
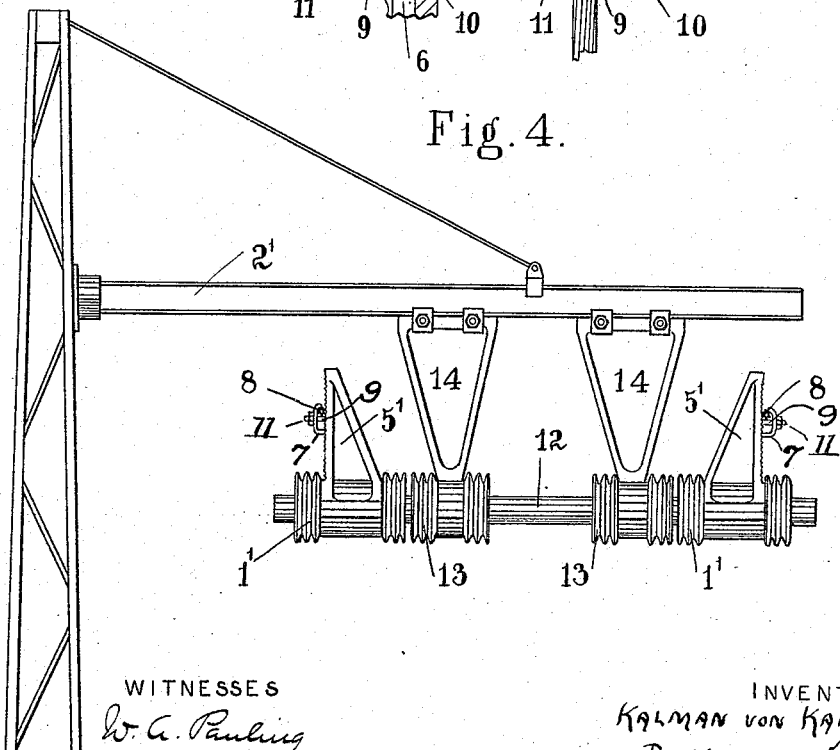

In the accompanying drawings Figure 1 is an elevation illustrating one method of carrying out my invention in practice. Fig. 2 is a detail view showing the method of clamping the suspension cable; Fig. 3 is a detail view of the clamping device shown in Fig. 2 as seen from below; Fig. 4 shows a constructional modification of my invention.

Referring to Figs. 1, 2 and 3, the insulators 1 are arranged upon the supporting arm 2. Adjusting rings 3 are used to keep the insulators in position being fixed by means of the screws 4. The intermediate members 5 are secured to the insulators each member being slotted so as to provide a vertical groove 6 and notched at the side as shown. 7 is a clamp adapted to hold the suspension wire or cable 8 against the notched side of the part 5. Said clamp is bored to allow the passage therethrough of the bolt 9, the head 10 of which is adapted to slide in the groove 6. The suspension cable 8 is located between the clamp and the rack of the intermediate member and may be held either above or below the bolt 9. After being placed in position the suspension cable is fixed by screwing up the nut 11. It will be obvious from this construction that the position of the bolt can be regulated at will and by this means the height of the suspension cable can be adjusted as desired.

In the constructional modification shown in Fig. 4 double insulation is provided for. An intermediate cross-bar 12 is supported by insulators 13 which are suspended by supports 14 from the bracket arm 2'. The insulators 1' are arranged on the cross-bar 12 and the intermediate members 5' may be fixed in position either above or below said cross-bar. The construction of the intermediate member and the fixing clamp is the same as described and shown in connection with Fig. 1.

Having now described my invention, what I claim as new and desire to secure by Letters Patent of the United States is:—

1. In a catenary suspension system for trolley wires of electric railways, the combination of a supporting arm, an insulator secured thereto and an intermediate member carried by said insulator to which the suspension wire is adjustably secured.

2. In a catenary suspension system for trolley wires of electric railways the combination of a supporting arm, an insulator secured thereon, an intermediate member carried by said insulator, a clamp adapted to secure the suspension wire to said intermediate member and means for regulating the height of said clamp.

3. In a catenary suspension system for trolley wires of electric railways, the combination of a supporting arm, an insulator secured to, but laterally adjustable thereon, an intermediate member carried by said insulator, a clamp adapted to secure a suspension wire to said intermediate member and means for regulating the height of the said clamp.

4. In a catenary suspension system for trolley wires of electric railways, the combination of a supporting arm, an insulator secured thereon, a notched intermediate member carried by said insulator, a clamp adapted to secure a suspension wire against the notched part of said intermediate member and means for regulating the height of the said clamp.

5. In a catenary suspension system for trolley wires of electric railways, the combination of a supporting arm, an insulator secured thereon, a slotted intermediate member carried by said insulator, a clamp adapted to secure a suspension wire to the intermediate member and a bolt passing through the clamp and slot in the intermediate member by which the height of the clamp can be adjusted, substantially as described.

6. In a catenary suspension system for trolley wires of electric railways, the combination of a supporting arm, insulators suspended from said arm, a second supporting arm supported on said insulators, insulators carried on said second supporting arm, intermediate members supported by said insulators and adjustable means for clamping a suspension wire to said intermediate members.

7. In a catenary suspension system for trolley wires of electric railways, the combination of a supporting arm, insulators suspended from said arm, a second supporting arm supported on said insulators, insulators laterally adjustable on said second supporting arm, intermediate members supported by said insulators and adjustable means for clamping a suspension wire to said intermediate members.

In testimony whereof, I have hereunto subscribed my name this 19th day of September 1908.

KALMAN VON KANDO.

Witnesses:
 GIARANNO SCIELLO,
 C. A. FERRARI.